United States Patent Office 3,086,024
Patented Apr. 16, 1963

3,086,024
PRODUCTION OF ANTHRAQUINONE DYES
Willy Braun, Heidelberg, and Manfred Ruske and Karl Maier, Ludwigshafen (Rhine), Germany, assignors to Badische Anilin- & Soda-Fabrik Aktiengesellschaft, Ludwigshafen (Rhine), Germany
No Drawing. Filed Jan. 13, 1961, Ser. No. 82,407
Claims priority, application Germany Jan. 15, 1960
5 Claims. (Cl. 260—326)

This invention relates to a process for the production of anthraquinone dyes. In particular, the invention relates to the reaction of 1,4-diaminoanthraquinone-2,3-dicarboxylic acid imide with 5- or 6-membered cyclic esters of carbonic acid and the same esters of sulfurous acid, these esters being derived from 1,2-dihydroxyethanes or 1,3-dihydroxypropanes which may contain a variety of substituents.

The invention furthermore provides a number of new and useful dyes of the formulae:

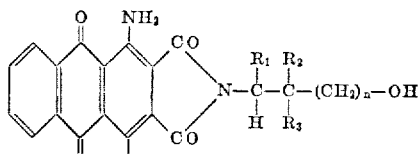

and

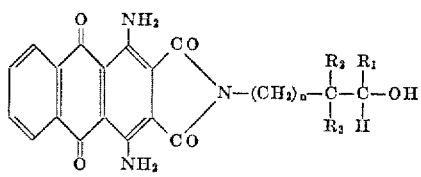

in which $R_1$, $R_2$ and $R_3$ denote hydrogen or alkyl containing 1 to 6 carbon atoms and in which $R_3$ may also stand for the following: halogen alkyl such as chloralkyl, bromalkyl and iodoalkyl wherein the alkyl contains 1 to 6 carbon atoms, alkoxyalkyl containing 1 to 6 carbon atoms, vinyl, phenyl and para-tolyl, and $n$ is 0 or 1. $R_1$, $R_2$ and $R_3$ can be the same or different substituents, with the proviso that they are not simultaneously hydrogen. Suitable alkyl substituents for $R_1$, $R_2$ and $R_3$ are, for example, methyl, ethyl, propyl or butyl. Specific examples of $R_3$ substituents are methoxy, ethoxy, propoxy or butoxy or the methyl, ethyl, propyl or butyl groups which are further substituted by 1 or 2 halogen such as chlorine, bromine or iodine. Other examples of $R_3$ include aryl groups such as the phenyl group and substituted phenyl groups such as the tolyl group. Beside the saturated alkyl groups, $R_3$ can also stand for unsaturated hydrocarbon groups such as the vinyl group.

Dye mixtures of compounds of the formulae:

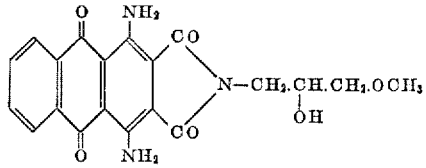

and

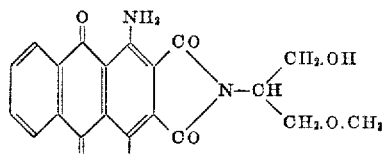

and mixtures of compounds of the formulae:

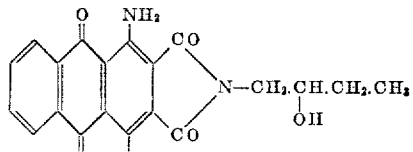

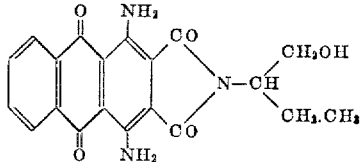

and

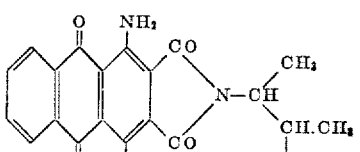

are of special technical interest.

We have found that valuable anthraquinone dyes of high purity and improved dyeing properties are obtained by reacting 1,4-diaminoanthraquinone-2,3 - dicarboxylic acid imide with 5- or 6-membered cyclic esters of carbonic acid or sulfurous acid; the cyclic esters are essentially derived from 1,2-dihydroxyethanes or 1,3-dihydroxypropanes in which the carbon atoms may be substituted.

The cyclic esters of carbonic acid or sulfurous acid— also referred to briefly as carbonates or sulfites—may contain as substituents for example halogen atoms, such as chlorine, bromine or iodine atoms, alkyl radicals, such as low molecular weight saturated or unsaturated alkyl radicals containing 1 to 6 carbon atoms, alkoxyl groups, such as alkoxyl groups containing 1 to 6 carbon atoms or aromatic radicals, such as aryl radicals with one to two benzene rings. The following compounds may be given as specific examples: ethylene sulfite, ethylene carbonate, propylene-carbonate-(1,2), 3-chlorpropylene - carbonate-(1,2), 3-methoxy-propylene-carbonate-(1,2), vinylethylene carbonate, butylene-carbonate-(1,2), butylene - carbonate-(2,3), phenylethylene carbonate, 5,5-dimethyl-1,3 - dioxanone-(2), 5-methyl-5-normal-propyl - 1,3 - dioxanone-(2), 5,5-dimethyl-1,3-dioxathione-(2) and 4-normal-propyl-5,5-dimethyl-1,3-dioxanone-(2).

These cyclic compounds correspond to one of the general formulae:

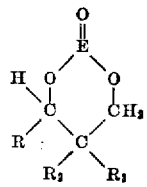

and

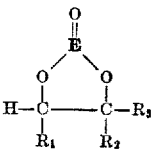

in which E denotes a carbon atom or a sulfur atom. Each of the radicals $R_1$ and $R_2$ which may be alike or different stands for a hydrogen atom or an alkyl radical containing 1 to 6 carbon atoms, for example a saturated radical such as methyl, ethyl, propyl or butyl radical. $R_3$ denotes a hydrogen atom or an alkyl or alkylene radical containing 1 to 6 carbon atoms, for example a saturated or unsaturated radical such as methyl, ethyl, propyl, butyl or vinyl. $R_3$ further stands for alkoxy-alkyl radicals containing 1 to 6 carbon atoms such as methoxyalkyl or ethoxyalkyl, or a halogen alkyl radical containing 1 to 6 carbon atoms such as chloralkyl, bromalkyl and iodine alkyl or an aryl radical, for example phenyl or paratolyl radical.

Mixtures of two or more of the cyclic esters of carbonic acid and/or sulfurous acid may also be used as starting materials for the process according to this invention.

For each mol of 1,4-diaminoanthraquinone-2,3-dicarboxylic acid imide, it is preferable according to the new process to start from 2 to 10 mols, especially 3 to 5 mols of the cyclic esters of carbonic acid or sulfurous acid and to work in a polar organic solvent which is inert under the reaction conditions, i.e. a solvent which does not react with the compounds to be interacted. Suitable solvents are, for example, N,N-dimethylformamide, acetamide, N-methylpyrrolidone or mixtures of the same. It is also preferable to carry out the reaction in the presence of about 0.05 to 1 mol of one or more agents having a strongly alkaline reaction, as for example an alkali metal hydroxide, carbonate or alcoholate, for example of sodium or potassium. The reaction proceeds as a rule at temperatures between 80° and 180° C., advantageously between 100° and 160° C., and in general does not require more than 1 to 4 hours. With ethylene carbonate, the reaction is ended after an hour. Heating for longer periods is however not injurious.

The process according to the invention may be carried out in solvents other than the above-mentioned polar solvents, for example in the esters of carbonic acid or sulfurous acid used as reactants themselves or in the usual organic solvents, such as nitrobenzene, ortho-dichlorbenzene or the mixture of the three isomeric trichlorbenzenes, in the presence or in the absence of the above-mentioned agents having a strongly alkaline action.

As a rule the reaction proceeds without difficulty under atmospheric pressure so that in general it is not necessary to use increased or reduced pressure. When using esters of sulfurous acid as initial materials it is advisable to remove the sulfur dioxide formed in the reaction with the aid of a stream of gas or air led through the reaction mixture.

From the literature, for example U.S. patent specification No. 2,628,963, it is already known that 1,4-diaminoanthraquinone - 2,3 - dicarboxylic acid-(2-hydroxyethyl)-imide is obtained when 2-hydroxyethylamine is allowed to act at 190° C. and under increased pressure for 4 hours on 1,4-diaminoanthraquinone-2,3-dicarboxylic acid imide. The blue dye thus obtained is however contaminated by red colored byproducts by reason of the high reaction temperature required for its formation. According to the new process, however, the same dye is obtained in larger yields and higher purity by reacting 1,4-diaminoanthraquinone-2,3-dicarboxylic acid imide in a polar solvent at atmospheric pressure with ethylene carbonate in the presence of an agent having a strongly alkaline reaction at 100° to 130° C., even within an hour. The dye prepared according to the new process is superior to the dye obtained in the known way in the clarity of its blue dyeings on fabric of polyethylene terephthalate and by its greater thermal stability.

The new dyes obtainable according to this invention, for example the condensation products of 1,4-diaminoanthraquinone-2,3-dicarboxylic acid imide with propylene-carbonate-(1,2) or 3-methoxypropylene-carbonate-(1,2), vinylethylene carbonate, butylene-carbonate-(1,2), butylene-carbonate - (2,3), phenylethylene carbonate, 5,5-dimethyl-1,3-dioxanone-(2), 5-methyl-5-normal-propyl-1,3-dioxanone-(2) and/or 5,5-dimethyl - 1,3-dioxathione-(2) are superior to 1,4-diaminoanthraquinone-2,3-dicarboxylic acid-(2-hydroxyethyl)-imide and the other dyes specified in U.S. patent specification No. 2,628,963 by their brilliance and their better absorptivity. They are moreover superior to the dyes known from U.S. patent specification No. 2,753,356 in their thermal stability, especially in fastness to sublimation and thermofixation (at 20 seconds heating at 190° C.). They are suitable as dispersion dyes quite generally for dyeing and printing hydrophobic fibrous material. Especially strong dyeings and prints are obtained however on materials, such as foils, films and textile materials, for example fibers, threads, flocks, woven fabrics and knitted fabrics of linear polyesters, such as polyethylene glycol terephthalate or based on terephthalic acid and paradimethylol-cyclohexane, which are dyed deep blue to turquoise shades of excellent light, wet and thermofixation fastness.

The invention is illustrated but not limited by the following examples. The parts and percentages are units by weight.

*Example 1*

16 parts of ethylene carbonate are introduced into a mixture, heated to 100° C., of 12.4 parts of 1,4-diaminoanthraquinone-2,3-dicarboxylic acid imide, 0.8 part of sodium hydroxide (finely ground) and 51 parts of N-methylpyrrolidone, the mixture heated to 120° C. within an hour and kept at this temperature for about 5 minutes. The reaction mixture is then cooled to 50° C., stirred with 100 parts of methanol, the deposited material filtered off by suction at 20° to 25° C., washed with a little methanol and then with water and dried. About 12.9 parts (92% of the theory) of pure 1,4-diaminoanthraquinone-2,3-dicarboxylic acid-(2-hydroxyethyl) - imide of the melting point 286° C. to 287° C. are obtained. The dye contains about 12.1% of nitrogen and dyes polyethylene glycol terephthalate fibers greenish blue shades. The shade of color is purer than a comparative dyeing obtained with a dye prepared according to Example 8 of the U.S. patent specification No. 2,628,963.

*Example 2*

6.2 parts of 1,4-diaminoanthraquinone-2,3-dicarboxylic acid imide, 1.1 parts of sodium carbonate and 23 parts of N,N-dimethylformamide are heated together to 100° C. and stirred with 8.2 parts of ethylene carbonate. The temperature is then raised within an hour to 120° C. Then the mixture is cooled to 20° to 25° C. and the reaction product filtered off by suction, washed with water and dried. The yield of 1,4-diaminoanthraquinone-2,3-dicarboxylic acid-(2-hydroxyethyl)-imide is about 92 to 93% of the theory. The dye corresponds in its tinctorial properties with the dye prepared according to Example 1.

*Example 3*

35.2 parts of ethylene carbonate are introduced at 140° C. into a mixture of 125 parts of nitrobenzene, 31 parts of 1,4-diaminoanthraquinone-2,3-dicarboxylic acid imide and 3 parts of sodium carbonate. The whole is heated within an hour to 160° C. and stirred for 3 hours at this temperature. After cooling to 30° C., the reaction material is filtered off by suction, washed with nitrobenzene, methanol and water and dried. About 33.8 parts (95.5% of the theory) of dye are obtained. The dye contains about 61.1% of carbon, 4.1% of hydrogen, 11.7% of nitrogen and 22.9% of oxygen and corresponds in its tinctorial properties to the dye obtained according to Example 1.

Ortho-dichlorbenzene or a commercial mixture of the three isomeric trichlorbenzenes may be used as solvent instead of nitrobenzene.

*Example 4*

18.6 parts of 1,4-diaminoanthraquinone-2,3-dicarboxylic acid imide and 1.8 parts of sodium carbonate are heated in 75 parts of N-methylpyrrolidone at 150° C. for about 10 minutes and then cooled to 100° C. At this temperature, 31.2 parts of propylene-carbonate-(1,2) are introduced, heated within an hour to 120° C. and the mixture kept at 120° C. for 2 hours. Then it is cooled to 20° to 25° C., the reaction material filtered off and washed with water. The condensation product of 1,4-diaminoanthraquinone-2,3-dicarboxylic acid imide and propylene-carbonate-(1,2) is obtained in a yield of about 80% in the form of a dark blue powder of the melting point 263° to 265° C. The new dye, which consists of a mixture of the two compounds of the formulae:

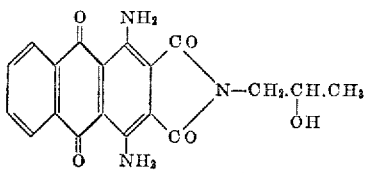

(Va)

and

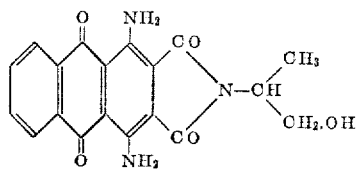

(b)

contains about 62.4% of carbon, 4.1% of hydrogen, 11.5% of nitrogen and 21.9% of oxygen and dyes polyester fabric based on ethylene glycol and terephthalic acid turquoise blue shades of very good light, wet and thermofixation fastness.

About 1.5 to 2 parts of sodium methylate or potassium ethylate may be used as the agent having a strongly alkaline reaction instead of sodium carbonate.

Example 5

22.8 parts of vinyl ethylene carbonate (obtainable according to the process of the U.S. patent specification No. 2,511,942) are introduced into a mixture, heated to 70° C., of 12.4 parts of 1,4-diaminoanthraquinone-2,3-dicarboxylic acid imide, 50 parts of N-methylpyrrolidone and 1.2 parts of sodium carbonate. The reaction material is then heated within an hour to 120° C. and kept at this temperature for about 45 minutes. Then it is diluted at 20° C. with 100 parts of methanol and the dye separated in the way described in Example 1. 13.5 parts of the condensation product of 1,4-diaminoanthraquinone-2,3-dicarboxylic acid imide and vinyl ethylene carbonate of the melting point 238° to 239° C. are thus obtained. The new dye, which consists of a mixture of the two compounds of the formulae:

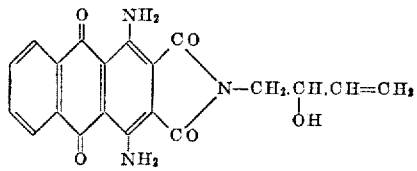

(Ia)

and

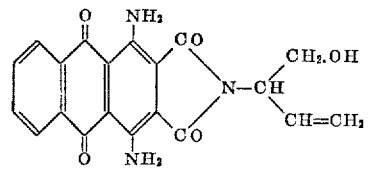

(b)

dyes textile material of polyethylene glycol terephthalate brilliant turquoise blue shades of especially good color strength and corresponds to the empirical formula $C_{20}H_{15}N_3O_5$.

*Analysis.*—Calculated: C, 63.6%; H, 3.98%; N, 11.1%; O, 21.2%. Found: C, 63.09%; H, 4.35%; N, 10.99%; O, 21.2%.

Example 6

8.2 parts of ethylene carbonate are introduced at 100° C. into a fused mixture of 30 parts of acetamide, 6.2 parts of 1,4-diaminoanthraquinone-2,3-dicarboxylic acid imide and 1.1 parts of sodium carbonate. The whole is then heated within an hour to 120° C., kept at this temperature for about 20 minutes, the melt cooled to 100° C. and stirred with 90 parts of hot water. The deposited reaction material is then filtered off by suction at 40° C. and washed with hot water. The dye is obtained in a yield of 96% of the theory. It corresponds in its properties with the dye obtained according to Example 1.

The same dye is obtained by working without sodium carbonate and stirring the melt for 2 hours at 160° C. instead of for about 20 minutes at 120° C.

Example 7

10 parts of 5,5-dimethyl-1,3-dioxanone-(2) are introduced into a mixture, heated to 150° C., of 25 parts of N-methylpyrrolidone, 6.2 parts of 1,4-diaminoanthraquinone-2,3-dicarboxylic acid imide and 0.6 part of sodium carbonate. The mixture is then heated to 160° C. within an hour and kept at 160° to 165° C. for 3 to 4 hours. The reaction material is worked up as described in Example 1. The 1,4-diaminoanthraquinone-2,3-dicarboxylic acid - (2,2-dimethyl-3-hydroxypropyl) - imide obtained in a good yield has a melting point of 239° to 243° C. The new dye of the formula:

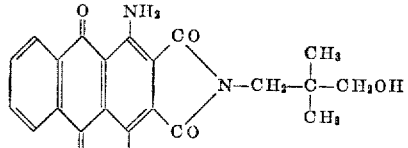

(VII)

dyes polyester fibers based on terephthalic acid and para-dimethylolcyclohexanone powerful greenish blue shades of good fastness properties.

The 5,5-dimethyl-1,3-dioxanone-(2) used can be prepared in the usual way by reaction of 2,2-dimethylpropane-diol-(1,3) with phosgene.

By using 0.8 part of potassium carbonate or 0.7 part of a mixture of 67% of sodium carbonate and 33% of potassium carbonate instead of sodium carbonate and proceeding otherwise as described in the first paragraph of this example, the dye of the Formula VII is also obtained in a good yield.

Example 8

10.8 parts of ethylene sulfite are introduced into a mixture of 6.2 parts of 1,4-diaminoanthraquinone-2,3-dicarboxylic acid imide, 1.3 parts of finely ground sodium hydroxide and 25 parts of N-methylpyrrolidone at 140° C. The mixture is stirred for 2 hours at this temperature; then 0.3 part of sodium hydroxide is added and stirring continued for another 3 hours at 140° C. Throughout the entire duration of the reaction a weak stream of nitrogen is led through the reaction mixture. The reaction material is worked up as in Example 1. 5.2 parts of the dye described in Example 1 are thus obtained.

1.5 parts of finely ground potassium hydroxide may be used instead of sodium hydroxide.

Example 9

9.3 parts of 1,4-diaminoanthraquinone-2,3-dicarboxylic acid imide and 1 part of sodium carbonate are heated together in 37 parts of N-methyl-pyrrolidone to 100° C. and stirred at this temperature with 7.8 parts of 3-methoxypropylene-carbonate-(1,2) (obtainable by reaction of 3-methoxypropylene oxide with carbon dioxide). The mixture is then heated to 120° C. and kept at this temperature for 2 hours. Then another 2.6 parts of 3-methoxypropylene-carbonate-(1,2) are added and the whole again stirred for 2 hours at 120° C. and then for 30 minutes at 140° C. The condensation product of 1,4-diaminoanthraquinone-2,3-dicarboxylic acid imide with 3-methoxypropylene-carbonate-(1,2) is separated as described in Example 1. The yield is 7 parts. The new dye, which consists of a mixture of the two dyes of the formulae:

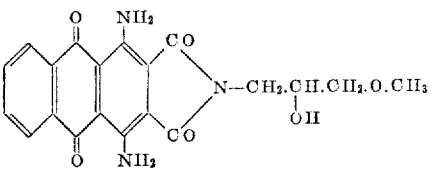

(IIa)

and

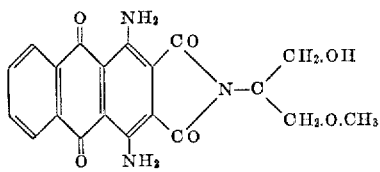

(IIb)

contains about 10.2% of nitrogen, usually has a melting point of 205° to 206° C. and dyes textile material of polyethylene glycol terephthalate deep blue shades of excellent fastness properties.

*Example 10*

By starting from 9.4 parts of 5,5-dimethyl-1,3-dioxathione-(2) in Example 7 instead of from 5,5-dimethyl-1,3-dioxanone-(2) and heating the reaction mixture, while leading nitrogen through the reaction mixture at the same time, to 160° C. in the course of an hour and then stirring for 4 hours at 160° C., 6.4 parts of dye are obtained. This dye is identical with the compound prepared according to Example 7. It has a nitrogen content of about 10.2%.

The sulfite used is obtainable by reaction of 2,2-dimethyl-propane-diol-(1,3) with thionyl chloride.

*Example 11*

6.2 parts of 1,4-diaminoanthraquinone-2,3-dicarboxylic acid imide and 1.1 parts of sodium carbonate are introduced into 40 parts of fused ethylene carbonate at 80° C. Then the melt is heated within 3 hours to 140° C. to 150° C., cooled to 60° C., the melt diluted with 90 parts of water, the reaction material filtered off by suction and washed with warm water. About 6.5 parts of the dye described in Example 1 are thus obtained.

*Example 12*

4.1 parts of 1,4-diaminoanthraquinone-2,3-dicarboxylic acid imide, 18 parts of N-methylpyrrolidone and 0.4 part of sodium carbonate are stirred at 140° C. with 6.2 parts of 5-methyl-5-normal-propyl-1,3-dioxanone-(2) (obtainable by reaction of 2-methyl-2-normal-propyl-propane-diol-(1,3) with phosgene) and thereafter heated to 160° C. within an hour. The mixture is kept at this temperature for 4 to 5 hours and the reaction material worked up in the usual way. 6.4 parts of 1,4-diaminoanthraquinone-2,3-dicarboxylic acid-(2-methyl-2-normal-propyl-3-hydroxypropyl)-imide of the formula

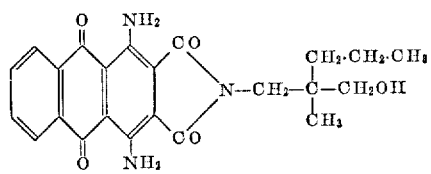

(VIII)

and of the melting point 198° to 201° C. are obtained. The new dye contains about 9.2% of nitrogen and dyes fabric on the basis of ethylene glycol and terephthalic acid in blue shades of very good light, wet and thermofixation fastness.

*Example 13*

If 30 parts of phenyl ethylene carbonate be used in Example 4 instead of proplyene carbonate and stirring is carried out for 6 hours at 120° to 220° C., 27.2 parts of the condensation product of 1,4-diaminoanthraquinone-2,3-dicarboxylic acid imide with phenyl ethylene carbonate are obtained in the form of a dark blue powder of the melting point 243° to 244° C. The new dye, which consists of a mixture of the two compounds of the formulae:

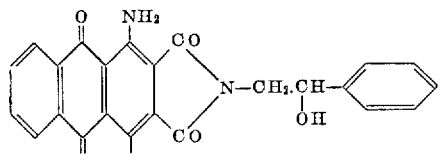

(IXa)

and

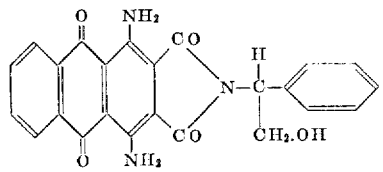

(IXb)

dyes fibers of polyethylene glycol terephthalate very vlear turquoise blue shades.

*Example 14*

100 parts of 1,4-diaminoanthraquinone-2,3-dicarboxylic acid imide and 9.8 parts of finely powdered sodium carbonate are heated in 784 parts of N,N-dimethylformamide for about 2 minutes at 140° C. The mixture is cooled to 100° C. and then within 5 minutes 75.8 parts of a commercial butylene carbonate mixture, consisting of about 55 to 60% of butylene-carbonate-(1,2) and about 40 to 45% of butylene-carbonate-(2,3) (obtainable by reaction of a commercial mixture of butylene-oxide-(1,2) and butylene-oxide-(2,3) with carbon dioxide) are added. The reaction mixture is then heated within 30 minutes to 120° C., kept for 4 to 5 hours at 120° to 130° C. and then allowed to cool slowly to 15° to 20° C. The deposited reaction material is filtered off by suction and washed consecutively with a little N,N-dimethylformamide, methanol and water. About 103 parts of dye of the melting point 233° to 236° C. are obtained. It dyes fabric of polyethylene glycol terephthalate turquoise blue shades of outstanding fastness to light, thermofixation and sublimation. The new dye consists of about 40 to 50% of 1,4-diaminoanthraquinone-2,3-dicarboxylic acid-(1-methyl-2-hydroxypropyl-1)-imide of the formula:

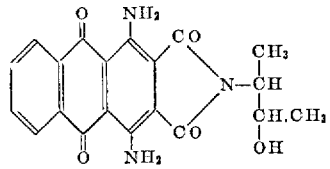

(IIIc)

and about 50 to 60% of a mixture of 1,4-diaminoanthraquinone-2,3-dicarboxylic acid-(2-hydroxybutyl-1)-imide of the formula:

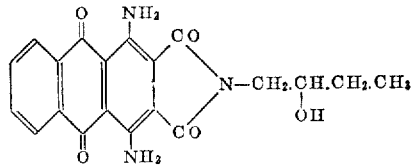

(IIIa)

and 1,4-diaminoanthraquinone-2,3-dicarboxylic acid-(1-hydroxymethylpropyl-1)-imide of the formula:

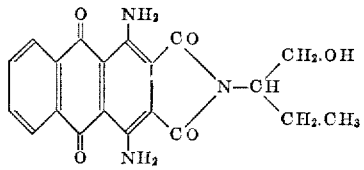

(IIIb)

and is characterized by a very good absorptivity on textile materials of linear polyesters.

We claim:

1. A process for the production of anthraquinone dyes which comprises reacting at a temperature of between 80° and 180° C. about one mol of 1,4-diaminoanthraquinone-2,3-dicarboxylic acid imide with about 2 to 10 mols of a compound selected from the group consisting of the formulae:

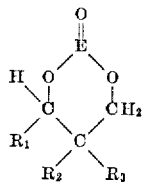

and

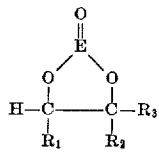

in which E denotes an atom selected from the group consisting of carbon and sulfur and $R_1$, $R_2$ and $R_3$ stand for a member selected from the group consisting of hydrogen, alkyl of 1 to 6 carbon atoms, alkoxyalkyl of 1 to 6 carbon atoms, vinyl, phenyl, para-tolyl and chloroalkyl, bromoalkyl and iodoalkyl, each of said halogen alkyls being of 1 to 6 carbon atoms, said reaction being carried out in the presence of an alkaline agent selected from the group consisting of hydroxides, carbonates and alcoholates of the metals sodium and potassium.

2. A process as claimed in claim 1 in which the reaction is carried out in the presence of an organic solvent which is inert under the reaction conditions.

3. A process for the production of anthraquinone dyes which comprises reacting at a temperature of between 100° and 160° C. in the presence of an alkaline agent selected from the group consisting of hydroxides, carbonates and alcohols of the metals sodium and potassium and in the presence of a polar organic solvent which is inert under the reaction conditions about 1 mol of 1,4-diaminoanthraquinone-2,3-dicarboxylic acid imide with about 3 to 5 mols of a compound selected from the group consisting of the formulae:

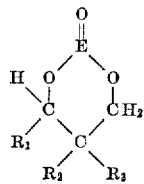

and

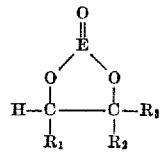

in which E denotes an atom selected from the group consisting of carbon and sulfur, $R_1$ and $R_2$ stand for a member selected from the group consisting of hydrogen and alkyl of 1 to 6 carbon atoms and $R_3$ stands for a member selected from the group consisting of hydrogen, alkyl of 1 to 6 carbon atoms, alkoxyalkyl of 1 to 6 carbon atoms, vinyl phenyl and para-tolyl and chloralkyl, bromalkyl and iodinealkyl, each of said halogen alkyls being of 1 to 6 carbon atoms.

4. A composition consisting essentially of a mixture of the anthraquinone dyes of the formulae:

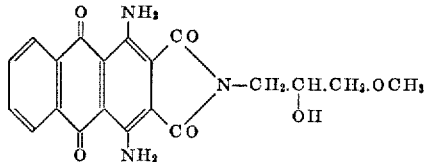

and

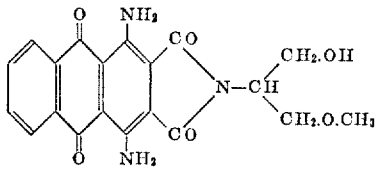

5. A process as claimed in claim 3 wherein said alkaline agent is present in an amount of 0.05 to 1 mol for each mol of said 1,4-diaminoanthraquinone-2,3-dicarboxylic acid.

References Cited in the file of this patent

UNITED STATES PATENTS

| | | |
|---|---|---|
| 2,628,963 | Laucius et al. | Feb. 17, 1953 |
| 2,753,356 | Laucius et al. | July 3, 1956 |

FOREIGN PATENTS

| | | |
|---|---|---|
| 723,079 | Great Britain | Feb. 2, 1955 |

UNITED STATES PATENT OFFICE
CERTIFICATE OF CORRECTION

Patent No. 3,086,024                                    April 16, 1963

Willy Braun et al.

It is hereby certified that error appears in the above numbered patent requiring correction and that the said Letters Patent should read as corrected below.

Column 5, line 27, for the indistinct "b" read -- (Vb) --; line 59, for "Ia)" read -- (VIa) --; line 68, for the indistinct printed matter read --(VIb) --; column 7, lines 16 to 23, for that portion of the formula reading

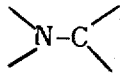  read  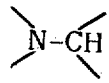

column 8, line 30, for "vlear" read -- clear --.

Signed and sealed this 31st day of December 1963.

EAL)
est:
NEST W. SWIDER                                   EDWIN L. REYNOLDS esting Officer                                        Acting Commissioner of Patents